United States Patent [19]
Chung et al.

[11] Patent Number: 6,063,895
[45] Date of Patent: May 16, 2000

[54] POLYESTER RESIN AND A PROCESS FOR PREPARING THE SAME

[75] Inventors: Hyun Soo Chung; Jae Wang Lee; Dong Hoon Kim, all of Seoul; Jung Nam Jun, Kyoungki-do; Sock Woo Lee, Kangwon-do, all of Rep. of Korea

[73] Assignee: Ire Chemical Ltd., Seoul, Rep. of Korea

[21] Appl. No.: 09/287,124

[22] Filed: Apr. 7, 1999

[30] Foreign Application Priority Data

Aug. 20, 1998 [KR] Rep. of Korea ............. 98-33834

[51] Int. Cl.[7] .................................................. C08G 63/02
[52] U.S. Cl. ............................................ 528/272; 528/271
[58] Field of Search ..................................... 528/271, 272

[56] References Cited

FOREIGN PATENT DOCUMENTS

| 95758B1 | 1/1995 | Rep. of Korea . |
| 95114171B1 | 6/1995 | Rep. of Korea . |
| 9525072A | 9/1995 | Rep. of Korea . |

*Primary Examiner*—Terressa Mosley-Boykin

[57] ABSTRACT

The present invention relates to a high molecular weighted biodegradable polyester resin which can be used in medical, agricultural and fishery packaging materials by enhancing the low heat-resistance of the general aliphatic polyester and the preparing method for them. The present invention provides a polyester resin which is prepared by condense-polymerization after one or a plurality of condensation, esterification and ester-exchange reaction with main ingredients of (1) an aliphatic (including circular aliphatic) dicarboxylic acid (or an acid anhydride thereof) including an adipic acid, (2) an aliphatic (including circular aliphatic) glycol at least selected from one of 1,4-butanediol and ethyleneglycol with a little of a monomer including one or a plurality of an amine radical from 0.1 to 30% by weight which is about theoretical polyester weight acting as a functional radical, wherein the polyester resin has a number average molecular weight of 30,000 to 70,000, a weight average molecular weight from 160,000 to 600,000, a melting point from 45° C. to 60° C. and a melt flow index from 0.1 to 50 g/10 min(190° C., 2,160 g) and the process for preparing and/or producing the same.

16 Claims, No Drawings

POLYESTER RESIN AND A PROCESS FOR PREPARING THE SAME

BACKGROUND OF THE INVENTION

1. Field of the Invention

The present invention relates to a biodegradable thermoplastic polyester resin and a process for preparing and/or producing the same. More particularly, the present invention relates to a high molecular weight biodegradable polyester resin which can be used in medical, agricultural packaging materials by enhancing the low heat-resistance of the general aliphatic polyester.

2. Description of the Background Art

The typical polyester resin used for various purposes such as textures and fibers, moldings and forming, or films, is a high molecular weight aromatic polyester resin produced by the polycondensation reaction of terephthalic acid with ethyleneglycol, or terephthalic acid with 1,4-butanediol. The high molecular weight polyester resin is a polymer having a number average molecular weight of over 10,000. A polyester resins are not degradable naturally so it is a serious, worldwide of environmental concern.

Otherwise, the aliphatic polyester resins are known as being biodegradable (Journal of Marcomol, SCI-Chem., A-23(3), 1986, 393–409). They have a variety of usage and in the medical and agricultural fields, and other applications are being developed.

However, the conventional aliphatic polyester resin has a low melt point and a high melting index, because of the structure of the main chain and crystallinity, and having low heat resistance and unsatisfactory mechanical properties, the usage of this polymer material has been limited. In order to utilize this aliphatic polyester resin it should have a number average molecular weight of more than 30,000. However, it is difficult to manufacture the aliphatic polyester resins having a number average molecular weight of more than 15,000 using the conventional polycondensation reaction system.

In order to solve this problem, Korean laid-open patent No. 95-758 discloses the process of preparing the high molecular weight aliphatic polyester resin having a number average molecular weight of more than 30,000, by controlling the reaction temperature, the degree of vacuum and the amount of catalyst. However, this aliphatic polyester resin is difficult to mold and form due to its low weight average molecular weight and low heat-resistance.

In another method, Korean laid-open patent No. 95-114171 discloses the process of preparing the high molecular weighted aliphatic polyester resin by introducing a monomer such as a polyhydric alcohol or a poly(at least tri)-hydric carboxylic acid. According to this process, the molding and forming ability can be enhanced by introducing the monomer into the reactor for reducing the time required for the reaction and diffusing the molecules into the product. However, the utilization of the polyester resin thereof is very difficult because the physical property such as a tensile strength is poor due to the increasing amount of the low molecular weight polyesters. Furthermore, it is difficult to control the reaction for preparing the polyester resin because the polyester resin easily becomes a gel type.

In yet another process for increasing the molecular weight of the aliphatic polyester resin, Korean laid-open patent No. 95-25072 discloses the high molecular weight aliphatic polyester resin produced by an isocyanate as a coupling material reacting to an aliphatic polyester resin having a number average molecular weight of 15,000 to 20,000 which is produced by de-hydration reaction or de-glycol reaction of the mixture of main materials of (1) an aliphatic glycol (including alicyclic glycol) and (2) an aliphatic dicarboxylic acid (or anhydrous acid of it) and a little of (3) monomer of polyhydric alcohol or polyhydric carboxylic acid (or acid anhydrous thereof). According to the application, the aliphatic polyester resin has a number average molecular weight of 20,000 to 70,000. However, this process requires more time for the reaction which leads to the poor production yield. And the isocyanate used as a coupling material for increasing the molecular weight is harmful to the human body so it needs to be handled carefully.

In the conventional process as mentioned above, it has been used to introduce a coupling material like an isocyanate or a monomer such as a polyhydric alcohol or polyhydric carboxylic acid. These conventional processes have many problems such as low production yields, poor physical properties or inabilities for molding and forming.

SUMMARY OF THE INVENTION

One object of the present invention is to provide a biodegradable polyester resin having a high molecular weight for the industrial products and a process for preparing it.

Another object is to provide a biodegradable polyester resin having physical properties such as a high melting point that is enough for molding and forming and a high heat-resistance enough for using in industrial or daily-life products and a process for preparing of it.

After intensive study, the present inventors have solved the above problems and have accomplished the above objects. Accordingly, the present invention provides a polyester resin which is prepared by polycondensation after one or a plurality of condensation, esterification and ester-exchange reaction with a main ingredient of (1) an aliphatic (including alicyclic) dicarboxylic acid (or an acid anhydride thereof) including an adipic acid, (2) an aliphatic (including alicyclic) glycol selected from at least one of 1,4-butanediol and ethylene-glycol with a little of a monomer including one or a plurality of an amine radical of 0.1 to 30% by weight that is about a weight of theoretical polyester acting as a functional radical, wherein the polyester resin has a number average molecular weight of 30,000 to 70,000, a weight average molecular weight from 160,000 to 600,000, a melting point from 45° C. to 60° C. and a melt flow index from 0.1 to 50 (190° C., 2,160 g) and the process for preparing and/or producing the same.

The present invention also provides a process for preparing and/or producing the above mentioned polyester resin comprising a first reacting step in which the dicarboxylic acid and the monomer are introduced and performed in at least one selected from condensation, esterification and ester-exchange reaction to produce and/or extract water or methanol, a second reacting step in which the product from the first step and the glycol are performed in esterification or ester-exchange reaction and the third reacting step in which the product from the second step would be a high molecular weight polyester resin by polycondensation.

DETAILED DESCRIPTION OF THE PREFERRED EMBODIMENTS

The polyester resin according to the present invention would be mentioned in detail hereinafter. The main ingredients are an aliphatic (including alicyclic) dicarboxylic acid (or an acid anhydride thereof) having an adipic acid and an aliphatic (including alicyclic) glycol having at least one selected from 1,4-butanediol and ethyleneglycol. The present invention preferably and essentially consists at least one selected from the group consisting (1) an adipic acid and 1,4-butanediol, (2) an adipic acid and ethyleneglycol (3) an adipic acid and a mixture of 1,4-butanediol and other glycol (having an alkylene radical (including cyclic alkylene) having carbon number of 2 to 3 or 5 to 10) and (4) an adipic acid, other dicarboxylic acid (having an alkylene radical (including circular alkylene radical) having carbon number of 2 to 3 or 5 to 10) and 1,4-butanediol. In the group (3), the weight ratio of 1,4-butanediol and other gylcol preferably ranges from 85:100–100:0. In the group (4), the weight ratio of adipic acid and other dicarboxylic acid preferably ranges from 85:100–100:0.

And the monomer added in the present invention is one or a plurality of amine radical as a functional radical. The monomer is preferably, at least one or a mixture selected from the group consisting 3-aminobenzhydrazide, 4-aminobenzhydrazide, 1,4-bis(3-aminoprophyl)piperazine, bis(hexamethylene)triamine, 5-chloro-m-phenylenediamine, diethylenetriamine, 1,7-diaminoheptane, 1,6-diaminohexane, N,N'-diaminoguanidine hydrochlororide, carbohydrazide, 1,4-cyclohexane-bis (methylamine), 3,4-diaminobenzhydrazide, 3,5-diaminobenzhydrazide, 4,4'-diaminodicyclohexylmethane, 4,4'-diamino-3,3'-dimethoxybiphenyl, 3,3'-diaminodiphenylmethane, 1,2-diaminocyclohexane, 3,3'-diaminodiphenylsulphone, 4,4'-diaminodiphenylsulphone, 4,6-diamino-2-methylmercaptopyrimidine, 2,4-diamino-6-methyl-1,3,5-triazine, 1,5-diaminonaphthalene, 1,8-diaminonaphthalene, 1,2-diaminopropane, 1,9-diaminoninane, 2,6-diaminopurine, 2,3-diaminopyridine, 2,6-diaminopyridine, 3,4-diaminopyridine, 2,5-diaminopyridine, dihydrochloride, 2,4-diaminoquinazoline, 4,4'-diamino-p-terphenyl, 2,6-diaminotoluene, 2,5-diaminotoluene sulphate, 2,4-diamino-1,3,5-triazine, 3,5-diamino-1,2,4-triazole.

The present invention provides a process for preparing and/or producing above mentioned polyester resin comprising three reacting steps which are mentioned below in detail.

In the first reacting step, during the course of one or a plurality of selected from the condensation, esterification and ester-exchange reaction, an aliphatic (including alicyclic) dicarboxylic acid having an adipic acid and a monomer having one or a plurality of amine radicals may be employed wherein the reacting temperature ranges from 160° C. to 240° C., then the water or the methanol produced thereof are extracted. If the reacting temperature is lower than 160° C. the water and the methanol are not extracted. If the reacting temperature is higher than 240° C. the reactant can be carbide or arsenate. The amount of the monomer preferably ranges from 0.1% to 30% by weight which is about theoretical weight of the polyester. If the amount of the monomer is less than 0.1 wt. % not only the reaction time becomes longer but also the physical properties becomes poorer. If the amount of the monomer is more than 30 wt. % the speed of biodegradation gets slower and the melting point gets higher so it is difficult to form and mold. During the reaction process, the chemical reaction is represented by the below formula (I), wherein an adipic acid is employed for the dicarboxylic acid and 1,6-diaminohexane is employed for the monomer.

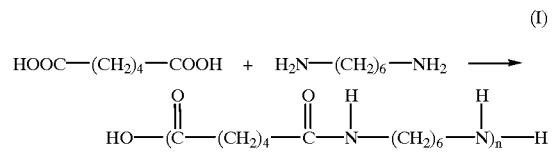

(I)

Wherein, n is an integer selected from 1 to 50.

The product from the reaction according to the formula (I) has a number average molecular weight of 200 to 10,000. The dicarboxylic acids are bonded at each ends of the structure of the product, because the amount of the dicarboxylic acid is more than monomer. After finishing the reaction, ingredients of the dicarboxylic acid which did not react remain in the reactor.

Next, in the second reaction step, the product of the first step and an aliphatic (including alicyclic) glycol having at least one selected from 1,4-butnediol and ethyleneglycol are employed into the reactor for esterification or ester-exchange reaction, so the produced water or methanol are extracted perfectly. During the reaction process, the chemical reaction is represented by the below formula (II) and (III), wherein a 1,4-butanediol is employed as the glycol. The formula (II) represents the chemical reaction of the product of the formula (I) and an aliphatic (including alicyclic) glycol. The formula (III) represents the esterification of the remaining aliphatic (including alicyclic) dicarboxylic acid (or an acid anhydride thereof) which did not react in the reactor and an aliphatic (including circular aliphatic) glycol.

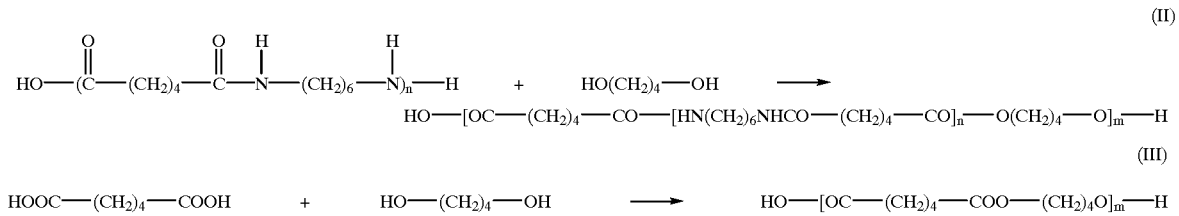

wherein n is an integer selected from 1 to 50 and m is an integer selected from 180 to 400. These chemical reaction formulas (II) and (III) are representative examples of the chemical reaction in the reactor. The mole ratio of the glycol to the dicarboxylic acid employed in the first step is 1:1.1–2. If the mole ratio of the dicarboxylic acid employed in the first step to the glycol is less than 1.1, color of the resin is inferior and the reactivity decreases. If the mole ratio is more than 2, the cost of preparation increases. So, it is preferable for the mole ratio to be 1:1.4.

Finally in the third reaction step, the polyester which is the reactant to the second step is condense- polymerized under the reaction temperature range of 210° C. to 270° C. and the degree of the vacuum range of 0.0005 to 10 Torr during reaction time ranging from 60 to 200 minutes to produce a high molecular weighted polyester. The product of the first step and the remaining dicarboxylic acids which did not react after completing the first step reacts chemically according to the formulas (II) and (III), the polyester resin can be produced having a number average molecular weight of from 30,000 to 70,000 and a weight average molecular weight from 160,000 to 600,000 by continuing the extraction of produced water, methanol or glycol and reacting to the molecules near-by.

At the start of and/or the end of the esterification or ester-exchange reaction in the second step, catalyst alone or a mixture of a plurality of catalysts can be added, wherein the amount of the catalyst(s) is preferably in the range of 0.02 to 2 wt. % which is about the total weight of the reactant. If the amount of catalyst employed is less than 0.02 wt. %, it is very slow to extract the theoretical amount of the water, methanol or glycol, or it is impossible to extract. If the amount of the catalyst employed is more than 2 wt. %, the color of the product is inferior even though the theoretical amount of the water, methanol or glycol are easily extracted. The catalysts are selected from one or a plurality of the metallic compounds consisting Ti, Ge, Zu, Fe, Mu, Co, and Zr, preferably, an organic metallic compound consisting titanate, antimonate or tin-oxide, more preferably, selected from one or a plurality of tetra-butyl-titanate, calcium-acetate, antimony-oxide, dibutyl-tin-oxide, zinc-acetate, antimony-acetate, antimony-glycolate, tetra-propyl-titanate.

Additionally, at the start of and/or the end of the esterification or ester-exchange reaction in the second step, a stabilizer should be added wherein the amount of the stabilizer employed preferably ranges from 0.02 to 2 wt. %. If the amount of the stabilizer used is less than 0.02 wt. %, the effect of the stabilizer is not sufficient and the color of the product is inferior. If the amount of the stabilizer exceeds 2 wt. %, the time required for the reaction is extended and the product would not be a high molecular weighted polyester. Therefore, the preferable amount of the stabilizer is about 0.22 wt. %, and the stabilizer used is at least one or a plurality selected from phosphatic stabilizers consisting tri-methyl-phosphate, phosphoric acid and tri-phenyl-phosphate.

The polyester resin according to the present invention is a condense-polymerized material having a high molecular weight through the three reacting processes, wherein the polyester resin has a number average molecular weight from 30,000 to 70,000 and a weight average molecular weight from 160,000 to 600,000, a melting point from 45° to 60° C. and a melt flow index from 0.1 to 50 g/10 min(190° C., 2,160 g). Because of the enhanced heat-resistance of the polyester resin according to the present invention, it is possible to use in industrial and day-life products. That is as the polyester of the present invention has high heat-resistance according to the amine radical in its molecular structure, it is useful as a resin material for the preparing medical, agricultural, fishery and packaging materials, and also as a raw material for the manufacturing office equipments and electrical home appliances as well as other areas including industry.

Having this invention described in general, a further understanding can be obtained with reference to certain specific examples which are provided hereinafter for the purpose of illustration only and are not intended to be limited unless otherwise specified.

EXAMPLE 1

First, after purging a 500 ml reactor with nitrogen, 146 g of adipic acid and 6 g of 1,6-diaminohexane are added to a reactor, and the mixture is esterified until the approximate theoretical amount of water is produced at the temperature of 200° C.

And then, 90 g of etyleneglycol and 0.1 g of tetrabutyl titanate acting as a catalyst are added thereto and it reacts for 2 hours until the approximate theoretical amount of water is produced at the temperature of 200° C. At the end of this reaction step, 0.1 g of antimony acetate, 0.2 g of dibutyl-tin-oxide and 0.07 g of tetra-butyl-titanate acting as catalysts and 0.2 g of tri-methyl-phosphate acting as a stabilizer are added thereto.

Finally, the temperature is elevated to 245° C. and poly-condensation (or condensation-polymerization) is allowed to proceed for 155 minutes under 0.3 Torr pressure.

The product has a melt flow index of 15 g/10 min(190° C., 2,160 g), a number average molecular weight of 31,000, a weight average molecular weight of 190,000 and a melting point of 45° C. measured by using a DSC (Differential Scanning Calorimeter).

EXAMPLE 2

First, after purging a 500 ml reactor nitrogen, 145 g of adipic acid and 7 g of 4-aminobenzhydrazide are added to a reactor, and the mixture is esterified until the approximate theoretical amount of water is produced at the temperature of 200° C.

And then, 90 g of ethylene-glycol and 0.1 g of tetra-butyl-titanate acting as a catalyst are added thereto and it reacts for 2 hours until the approximate theoretical amount of water is produced at the temperature of 200° C. At the end of this reaction step, 0.1 g of antimony-acetate, 0.2 g of dibutyl-tin-oxide and 0.07 g of tetra-butyl-titanate acting as catalysts and 0.2 g of tri-methyl-phosphate acting as a stabilizer are added thereto.

Finally, the temperature is elevated to 245° C. and poly-condensation is allowed to proceed for 200 minutes under 0.3 Torr pressure.

The product has a melt index of 8(190° C., 2,160 g), a number average molecular weight of 37,000, a weight average molecular weight of 270,000 and a melting point of 45° C. measured by using a DSC (Differential Scanning Calorimeter).

EXAMPLE 3

First, after purging a 500 ml reactor with nitrogen, 132.2 g of adipic acid 11.8 g of succinic acid and 4 g of 3-3'-diaminadzpherylmethane are added to a reactor and the mixture is esterified until the approximate theoretical amount of water is produced at the temperature of 200° C.

And then, 130 g of 1,4-butanediol and 0.1 g of tetra-butyl-titanate acting as a catalyst are added thereto and it reacts for 2 hours until the approximate theoretical amount of water is produced at the temperature of 200° C. At the end of this reaction step, 0.1 g of antimony-acetate, 0.2 g of dibutyl-tin-oxide and 0.07 g of tetra-butyl-titanate acting as catalysts and 0.2 g of tri-methyl-phosphate acting as a stabilizer are added thereto.

Finally, the temperature is elevated to 245° C. and poly-condensation is allowed to proceed for 180 minutes under 0.3 Torr pressure.

The product has a melt index of 5(190° C., 2,160 g), a number average molecular weight of 39,200, a weight average molecular weight of 338,000 and a melting point of 50° C. measured by using a DSC (Differential Scanning Calorimeter).

EXAMPLE 4

First, after purging a 500 ml reactor with nitrogen, 146 g of adipic acid and 3 g of 1,2-diaminocyclohexane are added to a reactor, and the mixture is esterified until the approximated theoretical amount of water is produced at the temperature of 200° C.

And then, 130 g of 1,4-butanediol and 0.1 g of tetra-butyl-titanate as catalyst are added thereto and it reacts for 2 hours until the approximate theoretical amount of water is produced at the temperature of 200° C. At the end of this reaction step, 0.1 g of antimony-acetate, 0.2 g of dibutyl-tin-oxide and 0.07 g of tetra-butyl-titanate acting as catalysts and 0.2 g of tri-methyl-phosphate acting as a stabilizer are added thereto.

Finally, the temperature is elevated to 245° C. and poly-condensation is allowed to proceed for 180 minutes under 0.3 Torr pressure.

The product has a melt index of 11(190° C., 2,160 g), a number average molecular weight of 34,500, a weight average molecular weight of 280,000 and a melting point of 59° C. measured by using a DSC (Differential Scanning Calorimeter).

EXAMPLE 5

First, after purging a 500 ml reactor with nitrogen, 146 g of adipic acid and 5 g of 4-aminobenzhydrazide are added to a reactor, and the mixture is esterified until the approximate theoretical amount of water is produced at the temperature of 200° C.

And then, 130 g of 1,4-dibutanediol and 0.1 g of tetra-butyl-titanate acting as catalyst are added thereto and it reacts for 2 hours until the approximate theoretical amount of water is produced at the temperature of 200° C. At the end of this reaction step, 0.1 g of antimony-acetate, 0.2 g of dibutyl-tin-oxide and 0.07 9 of tetra-butyl-titanate acting as catalysts and 0.2 g of tri-methyl-phosphate acting as a stabilizer are added thereto.

Finally, the temperature is elevated to 245° C. and poly-condensation is allowed to proceed for 200 minutes under 0.3 Torr pressure.

The product has a melt index of 8(190° C., 2,160 g), a number average molecular weight of 40,000, a weight average molecular weight of 310,000 and a melting point of 59° C. measured by using a DSC (Differential Scanning Calorimeter).

COMPARATIVE EXAMPLE 1

After purging a 500 ml reactor with nitrogen, 108 g of 1,4-butanediol and 118 g of succinic acid are added to a heat-melting condensation reactor. After the temperature is elevated under an atmosphere of nitrogen, esterification is allowed for 5 hours at the temperature from 140° C. to 200° C., and esterification is continually allowed for 1.5 hours under 20 to 2 mmHg pressure.

The product has a number average molecular weight of 4,900, and a weight average molecular weight of 11,200.

Next, 0.2 g of tetra-isoprophiltane acting as a catalyst is added thereto under atmosphere of nitrogen. Then, the de-glycol reaction is allowed for 6 hours under 15 to 0.2 mmHg pressure at the temperature of 220° C.

The product has a number average molecular weight of 16,100, a weight average molecular weight of 44,100 and a melting point of 118° C. measured by using a DSC (Differential Scanning Calorimeter).

COMPARATIVE EXAMPLE 2

After purging a 500 ml reactor with nitrogen, 92 g of ethylene-glycol, 118 g of succinic acid and 0,07 g of tetra-butyl-titanate acting as a catalyst are added to a heat-melting condensation reactor. After the temperature is elevated under an atmosphere of nitrogen, esterification is allowed for 2 hours at the temperature of 200° C. and esterification is continually allowed for 0.5 hours under 20 to 2 mmHg pressure.

Next, 0.07 g of tetra-butyl-titanate and 0.45 g of dibutyl-tin-oxide acting as catalyst, and 0.2 g of tri-methyl-phosphate acting as stabilizer are added thereto under atmosphere of nitrogen. Then, the de-glycol reaction is allowed for 18 hours under 15 to 0.2 mmHg pressure at the temperature of 250° C.

The product has a weight average molecular weight of 9,000, a weight average molecular weight of 32,000 and a melting point of 100° C. measured by using a DSC (Differential Scanning Calorimeter).

COMPARATIVE EXAMPLE 3

After purging a 500 ml reactor with nitrogen, 108 9 of 1,4-butanediol, 21.9 g of adipic acid and 100.3 g of succinic acid are added to a heat-melting condensation reactor. After the temperature is elevated under an atmosphere of nitrogen, esterification is allowed for 2 hours at the temperature of 200° C. and esterification is continually allowed for 0.5 hours under 20 to 2 mmHg pressure.

Next, 0.07 g of tetra-butyl-titanate and 0.45 g of dibutyl-tin-oxide acting as a catalyst, and 0.2 g of tri-methyl-phosphate acting as a stabilizer are added thereto under atmosphere of nitrogen. Then, the de-glycol reaction is allowed for 3.2 hours under 15 to 0.2 mmHg pressure at the temperature of 250° C.

The product has a number average molecular weight of 31,000, a weight average molecular weight of 84,000 and a melting point of 95° C. measured by using a DSC (Differential Scanning Calorimeter).

COMPARATIVE EXAMPLE 4

After purging a 500 ml reactor with nitrogen, 92 g of ethylene-glycol, 118 g of succinic acid, 0.5 g of glycerin and 0,07 g of tetra-butyl-titanate acting as a catalyst are added to a heat-melting condensation reactor. After the temperature is elevated under an atmosphere of nitrogen, esterification is allowed for 2 hours at the temperature of 200° C., and esterification is continually allowed for 0.5 hours under 20 to 2 mmHg pressure.

Next, 0.07 g of tetra-butyl-titanate and 0.45 g of dibutyl-tin-oxide acting as catalyst, and 0.2 g of tri-methyl-phosphate and 0.2 g of tetra-isoprophiltane acting as a stabilizer are added thereto under atmosphere of nitrogen. Then, the de-glycol reaction is allowed for 2.5 hours under 15 to 0.2 mmHg pressure at the temperature of 250° C.

The product has a number average molecular weight of 27,000, a weight average molecular weight of 221,000 and a melting point of 99° C. measured by using a DSC (Differential Scanning Calorimeter).

The properties of the polyester resin of the present invention according to the examples 1 to 5 and the conventional polyester resin according to the comparative examples 1 to 4 are provided in Table 1.

Measuring Methods

1. Melting point: measured by using a Differential Scanning Calorimeter(DSC) with the rate of the elevating temperature of 10° C. per minute.

2. Melt Flow Index: measured under conditions where the temperature is 190° C. and the load is 2,160 g by the method of ASTM D1238.

3. Molecular weight: measured by using Gel Permeation Chromatography(GPC).

TABLE 1

| | Examples | | | | |
|---|---|---|---|---|---|
| | 1 | 2 | 3 | 4 | 5 |
| succinic acid | | | 11.8 | | |
| adipic acid | 146 | 146 | 132.6 | 146 | 146 |
| ethylene-glycol | 90 | 90 | | | |
| 1,4-butanediol | | | 130 | 130 | 130 |
| glycerin | | | | | |
| 1,6-diaminohexane monomer 1 | 6 | | | | |
| 4-aminobenzhydrazide | | 7 | | | 5 |
| 3,3-diamino-diphenylmethane monomer 2 | | | 4 | | |
| 1,2-diaminocyclohexane | | | | 3 | |
| heat-resistance | 170 | 160 | 210 | 210 | 230 |
| a number average molecular weight | 31,000 | 37,000 | 39,2000 | 34,500 | 40,000 |
| a weight average molecular weight | 190,000 | 270,000 | 338,000 | 280,000 | 310,000 |
| tensile strength (kg/cm$^2$)/ elongation (%) | 300/ 500 | 320/ 400 | 450/ 900 | 450/ 900 | 470/ 700 |
| melt flow index (g/10 min at 190° C., 2160 g) | 15 | 8 | 5 | 11 | 8 |
| melting point (° C.) | 45 | 45 | 50 | 59 | 59 |

| | Comparative Examples | | | |
|---|---|---|---|---|
| | 1 | 2 | 3 | 4 |
| succinic acid | 118 | 118 | 100.3 | 118 |
| adipic acid | | | 21.9 | |
| ethylene-glycol | | 92 | | 92 |
| 1,4-butanediol | 108 | | 108 | |
| glycerin | | | | 0.5 |
| 1,6-diaminohexane monomer 1 | | | | |
| 4-aminobenzhydrazide | | | | |
| 3,3-diamino-diphenylmethane monomer 2 | | | | |
| 1,2-diaminocyclohexane | | | | |
| heat-resistance | | | | |
| a number average molecular weight | 16,100 | 9,000 | 31,000 | 27,000 |
| a weight average molecular weight | 44,100 | 32,000 | 84,000 | 221,000 |
| tensile strength (kg/cm$^2$)/ elongation (%) | 130/ 100 | N | 350/ 300 | 220/ 50 |
| melt flow index (g/10 min at 190° C., 2160 g) | N | 60 | N | N |
| melting point (° C.) | 118 | 100 | 95 | 99 |

As shown in table 1, the polyester resin of the present invention has high number in number average molecular weight, high number in weight average weight, low melt index, and good mechanical properties such as a tensile strength.

THE ADVANTAGES OF THE PRESENT INVENTION

The present invention suggests a process for preparing a high molecular weighted biodegradable polyester resin comprising three steps of reacting dicarboxylic acid ingredient and monomer, esterification or ester-exchange reacting with glycol thereto and polycondensing. According to the present invention, there is no evidence that the low molecular weighted polyester is increasing and the products easily becomes a gel type.

The polyester resin of the present invention has high heat-resistance and tensile strength so it is possible to use in preparing medical, agricultural packaging materials as well as other areas including industry where biodegradability is required.

What is claimed is:

1. A polyester resin comprising an aliphatic polyester having a number average molecular weight of from 30,000 to 70,000, determined by GPC; a weight average molecular weight of from 160,000 to 600,000, determined by GPC; a melting point of from 45° C. to 60° C., determined by DSC; and a melt flow index of from 0.1 to 50 g/10 min (190° C., 2160 g) determined by ASTM D1238, which is prepared by polycondensation after performing reactions which are selected from at least one of the following reactions: a condensation reaction, or an esterification reaction, or an ester-exchange reaction with (1) adipic acid or a mixture of adipic acid with an aliphatic or alicyclic dicarboxylic acid or an anhydride thereof;

(2) a glycol component which comprises at least one member selected from 1,4-butanediol and ethylene glycol; and (3) a monomer component which comprises at least one amine radical acting as a functional radical, of which the amount of the amine radicals is 0.1%–30% by weight based upon the weight of the polyester.

2. The polyester resin according to the claim 1, wherein the polyester resin is prepared by performing reactions which are selected from at least one or a plurality reactions of condensation reaction, esterification and ester-exchange reaction with the dicarboxylic acid and the monomer;

performing esterification or ester-exchange reaction with the glycol; and performing the polycondensation.

3. The polyester resin according to the claim 1, wherein the mole ratio of the glycol to the dicarboxylic acid is 1:1.1 to 2.

4. The polyester resin according to the claim 1, wherein the ingredient of the dicarboxylic acid adipic acid by itself; and the ingredient of the glycol is 1,4-butanediol by itself.

5. The polyester resin according to the claim 1, wherein the ingredient of the dicarboxylic acid is adipic acid by itself; and the ingredient of the glycol is alone of ethyleneglycol.

6. The polyester resin according to the claim 1, wherein the ingredient of the dicarboxylic acid adipic acid by itself; and the ingredient of the glycol is a mixture of 1,4-butanediol and other glycol (alkylene radical (including cyclic alkylene) having carbon numbers of 2 to 3 or 5 to 10).

7. The polyester resin according to the claim 6, wherein the amount ratio of the 1,4-butanediol to the other glycol is from 85:15 to 100:0.

8. The polyester resin according to the claim 1, wherein the ingredient of the dicarboxylic acid is a mixture of adipic acid and other dicarboxylic acid having an alkylene radical (including cyclic alkylene) having carbon numbers of 2 to 3 or 5 to 10; and the ingredient of the 1,4-butanediol is ethyleneglycol by itself.

9. The polyester resin according to the claim 8, wherein the amount ratio of the adipic acid to the other dicarboxylic acid is from 90:10 to 100:0.

10. The polyester resin according to the claim 1, wherein the monomer is one or a plurality of selected from a group consisting 3-aminobenzhydrazide, 4-aminobenzhydrazide, 1,4-bis(3-aminoprophyl)piperazine, bis(hexamethylene) triamine, 5-chloro-m-phenylenediamine, diethylenetriamine, 1,7-diaminoheptane, 1,6-diaminohexane, N,N'-diaminoguanidine hydrochlororide, carbohydrazide, 1,4-cyclohexane-bis-(methylamine), 3,4-diaminobenzhydrazide, 3,5-diaminobenzhydrazide, 4,4'-diaminodicyclohexylmethane, 4,4'-diamino-3,3'-dimethoxybiphenyl, 3,3'-diaminodiphenylmethane, 1,2-diaminocyclohexane, 3,3'-diaminodiphenylsulphone, 4,4'-diaminodiphenylsulphone, 4,6-diamino-2-methylmercaptopyrimidine, 2,4-diamino-6-methyl-1,3,5-triazine, 1,5-diaminonaphthalene, 1,8-diaminonaphthalene, 1,2-diaminopropane, 1,9-diaminoninane, 2,6-diaminopurine, 2,3-diaminopyridine, 2,6-diaminopyridine, 3,4-diaminopyridine, 2,5-diaminopyridine, dihydrochloride, 2,4-diaminoquinazoline, 4,4'-diamino-p-terphenyl, 2,6-diaminotoluene, 2,5-diaminotoluene sulphate, 2,4-diamino-1,3,5-triazine, 3,5-diamino-1,2,4-triazole.

11. A method for preparing a high molecular weight polyester resin comprising:

a first step of performing reaction which are selected from at least one or a plurality of condensation, esterification and ester-exchange reaction with an aliphatic dicarboxylic acid (or) having an adipic acid (including alicyclic) and a monomer having one or a plurality of amine radicals acting as a functional radical of which amount is 0.1–30% by weight which is about theoretical amount of the polyester at the temperature from 160° C. to 240° C.;

a second step of performing reaction which are selected from one of esterfication and ester-exchange reaction at the production of the first step with an aliphatic glycol (including alicyclic) having selected from one of 1,4-butanediol and ethylene-glycol at the temperature from 200° C. to 220° C.; and a third step of performing a polycondensation of the product of the second step at the temperature from 210° C. to 270° C. under 0.005 to 10 Torr pressure.

12. The method for preparing the high molecular weight polyester resin according to the claim 11, wherein the mole ratio of the glycol to the dicarboxylic acid is 1:1.1 to 2.

13. The method for preparing the high molecular weight polyester resin according to the claim 11, wherein from 0.02 to 2 weight % of a catalyst is presented at the start or end of the esterification or ester-exchange reaction in the second step.

14. The method for preparing the high molecular weight polyester resin according to the claim 11, wherein at least one or mixed catalyst is selected from the group consisting tetra butyltitanate.

15. The method for preparing the high molecular weight polyester resin according to the claim 11, wherein from 0.02 to 2 weight % of a stabilizer is presented at the start or at the end of the esterification or ester-exchange reaction in the second step.

16. The method for preparing the high molecular weight polyester resin according to the claim 11, wherein at least one or mixed catalyst is selected from the group consisting tri-methyl-phosphate, phosphatic acid and tri-phenyl-phosphate.

* * * * *